(12) United States Patent
Parikh (10) Patent No.: US 8,261,621 B2
(45) Date of Patent: Sep. 11, 2012

(54) MEASUREMENT OF FORCES ON PACKAGED OBJECTS

(75) Inventor: Michelle Parikh, Webster Groves, MO (US)

(73) Assignee: Mott's LLP, Rye Brook, NY (US)

( * ) Notice: Subject to any disclaimer, the term of this patent is extended or adjusted under 35 U.S.C. 154(b) by 279 days.

(21) Appl. No.: 12/609,857

(22) Filed: Oct. 30, 2009

(65) Prior Publication Data

US 2011/0100139 A1   May 5, 2011

(51) Int. Cl.
*G01D 7/00* (2006.01)
(52) U.S. Cl. ................................................. 73/862.041
(58) Field of Classification Search ............ 73/862.041–862.046
See application file for complete search history.

(56) References Cited

U.S. PATENT DOCUMENTS

| | | | |
|---|---|---|---|
| 2,976,732 A | 3/1961 | Hautly | |
| 3,988,934 A * | 11/1976 | Kamphoefner et al. | 73/865.4 |
| 4,726,436 A * | 2/1988 | Fukuyama et al. | 177/211 |
| 5,022,475 A * | 6/1991 | Sato et al. | 177/211 |
| 5,391,844 A * | 2/1995 | Johnson et al. | 177/229 |
| 6,556,024 B2 * | 4/2003 | Sasaki et al. | 324/660 |
| 6,904,693 B2 | 6/2005 | Paakkinen | |
| 7,243,545 B2 | 7/2007 | Sakai et al. | |
| 7,903,090 B2 * | 3/2011 | Soss et al. | 345/173 |
| 8,015,881 B2 * | 9/2011 | Motoyama | 73/717 |
| 2005/0120809 A1 * | 6/2005 | Ramming | 73/862.044 |
| 2008/0271929 A1 * | 11/2008 | Whitney | 177/25.12 |
| 2008/0295614 A1 | 12/2008 | Lancaster, III et al. | |

\* cited by examiner

*Primary Examiner* — Lisa M. Caputo
*Assistant Examiner* — Octavia Davis-Hollington
(74) *Attorney, Agent, or Firm* — Cox Smith Matthews Incorporated (57) ABSTRACT

Force sensors may be useful for the measurement of forces on objects or packaging material in shipping articles during a packaging process. In some embodiments, a part of those force sensors may be similar or complementary to those objects or packaging material. Force data may be collected during packaging processes and may be used to determine conditions useful for improving those packaging processes.

20 Claims, 7 Drawing Sheets

MEASUREMENT OF FORCES ON PACKAGED OBJECTS

FIELD

This application relates to sensors useful for measurement of forces on objects that may be subject to a packaging process and to the use of those sensors in methods of improving packaging processes.

BACKGROUND

During various steps in a packaging process, an object may be subject to various forces. Those steps include without limitation transport of an object during manufacture, shrink wrapping of an object, loading of shipping articles on pallets, application of shrink wrap or another protective coating to a pallet, unloading shipping articles from pallets, transport of a shipping article from a factory, and storage of shipping articles at a distribution site. Those steps may apply forces that act in any direction, including the same direction, or in opposite directions, and may cause various types of damage to an item, including but not limited to crushing, bending, dislodging the item from its intended packaging material, or any combination of the foregoing.

Shrink wrapping is one non-limiting example of a common packaging step used to protect numerous objects, including beverage containers, such as cans or bottles, for example. Application of a shrink wrap film protects the objects, allows a convenient surface for application of labels, may provide protection from water or environmental damage, and may protect the objects from becoming displaced during shipping. In a shrink wrap procedure, a polymer film may be warmed and stretched over one or more objects. As that polymer film cools, it contracts and therefore seals the objects over which it was placed. During that contraction, the film may pull the objects in any number of directions. In a well designed process, such forces are controlled and are maintained within acceptable levels such that those forces may not damage the packaged objects. If the process is not well controlled, the forces associated with a shrink wrap process may damage the shrink wrapped objects. The design of a shrink wrap process may be done in a manner that is largely based on trial and error, wherein variables associated with the shrink wrap process are modified randomly, or based on an operator's experience with the process and objects to be wrapped. Such an approach may be time consuming and may not result in a process that is robust or optimized. There is a need for an efficient method and apparatus for measuring forces in packaging processes, including but not limited to shrink wrapping, in order to optimize those packaging processes.

SUMMARY

Force sensors are described that may be useful for the measurement of forces on objects or packaging material in shipping articles during a packaging process. In some embodiments, a part of those force sensors may be similar or complementary to those objects or packaging material. Force data may be collected during those packaging processes and may be used to determine conditions useful for improving those packaging processes.

DETAILED DESCRIPTION

As used herein, the following terms should be understood to have the indicated meanings:

When an item is introduced by "a" or "an," it should be understood to mean one or more of that item.

The term "baseline packaging process" means a packaging process having at least one reference parameter.

"Comprises" means includes but is not limited to.

"Comprising" means including but not limited to.

The term "external force" means any force that originates from an environment outside of a force sensor.

The term "force" means any phenomenon that tends to produce translational acceleration, rotational acceleration, or both translational and rotational acceleration of an object in any direction. Such object may or may not actually undergo observable movement as a result of an applied force.

The term "force sensor" means an instrument for measuring one or more forces.

"Having" means including but not limited to.

The term "inner wall" means a part of a force sensor that has at least one surface against which a load cell may be engaged.

The term "load cell" means a device that produces a measurable signal in response to a force. By way of example, a load cell may operate by means including but not limited to changes in pressure of a fluid in a cylinder, or changes in electrical resistance of a component under strain. A load cell may measure various forces including but not limited to tension, compression, and shear forces. A part of a load cell may be capable of rotation and may be capable of measuring a torque. A load cell under strain may be physically deformed to any desired degree in the operation of measuring a force.

The term "memory" means any storage medium capable of storing machine-readable information in electrical, magnetic, optical, or other form. A memory may include but is not limited to a chip, disk, tape, RAM, DRAM, ROM, PROM, EPROM, EEPROM, virtual memory, or a combination of any of the foregoing.

The term "object" means any physical item, whether manufactured, naturally occurring, or otherwise.

The term "outer wall" means a part of a force sensor that has at least one surface that faces the outside of that force sensor.

The term "packaging material" means any material that may be used to organize, protect, contain, or handle one or more objects in a packaging process. By way of example, packaging material may include but is not limited to cartons, pallets, shrink wrap, boxes, tape, bubble wrap, envelopes, Styrofoam, or a combination of any of the foregoing.

The term "packaging process" means one or more steps involved in distribution of an object to a consumer.

The term "shipping article" means a combination of one or more force sensors with packaging material. A shipping article may be at any stage in a packaging process and may or may not include one or more objects.

A number of steps may be involved in a packaging process for an object. During any of those steps, any number of forces may be applied to a shipping article, and in those steps one or more objects or packaging material may be damaged. Measurement of the forces on objects and/or on packaging material may be used to understand and optimize those steps in a packaging process. In some embodiments of a method of optimizing packaging process steps, one or more force sensors may be included with a shipping article.

Figure 1:
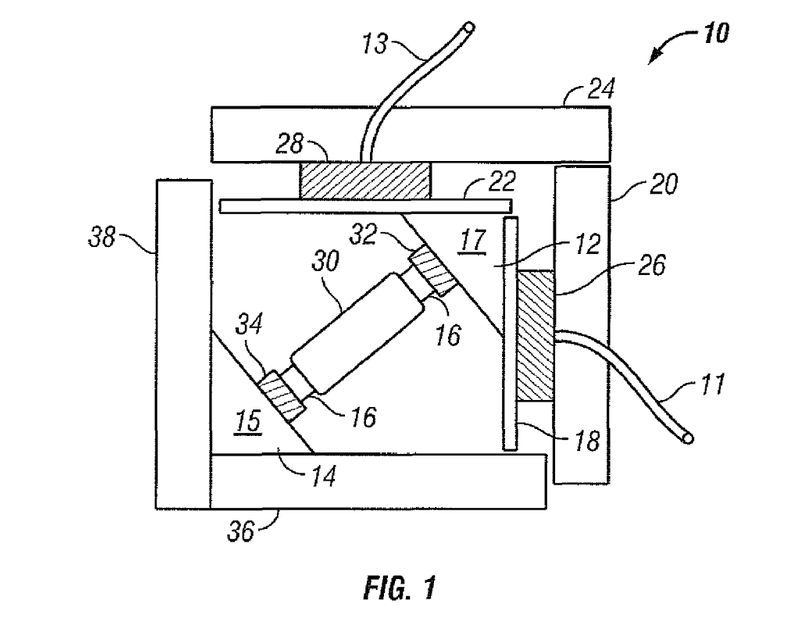
FIG. 1 is a top plan view of a force sensor.

FIG. 1 shows a force sensor 10 that may be used to measure forces in a packaging process. Force sensor 10 may include inner walls 18, 22, outer walls 20, 24, 36, 38, and spacers 12, 14 that are connected using a screw or other suitable connector 16, which may or may not be adjustable. Spacer 12 may be connected to inner walls 18 and 22, and spacer 14 may be connected to outer walls 36 and 38. A first load cell 26 may be located between inner wall 18 and outer wall 20, and a second load cell 28 may be located between inner wall 22 and outer wall 24. Each of outer wall 20 and outer wall 24 may transfer an incident force from the external environment of force sensor 10 to the load cells 26 and 28, respectively, with which such wall is in contact. Inner wall 18, inner wall 22, outer wall 36, and outer wall 38 may rest upon a floor or base (not shown), which may or may not be part of force sensor 10. In other embodiments, spacer elements or other components may provide a base upon which a force sensor may sit. The relative dimensions of the outer walls of some force sensors may be sized such that a base region maintains those walls such that they are not in contact with the floor. That orientation may be useful to prevent those walls from experiencing at least some frictional forces. In still other embodiments, a force sensor may not have a base region and may not sit on a floor or surface. For example and without limitation, a sensor may be attached to a hook and hung from a ceiling element or otherwise suspended. Load cell 26 may be connected to a conduit 11, which may include one or more wires or fluid connections such as may be necessary to use load cell 26, including without limitation to input or output data, including without limitation force related data from load cell 26. Load cell 28 may be connected to a conduit 13, which may serve similar functions for load cell 28 as described above for conduit 11 in connection with load cell 26. In some embodiments, if connector 16 comprises a screw, connector 16 may include a hex nut 30, a first contact nut 32, and/or a second contact nut 34, any or all of which may be adjusted to change the relative position of spacer 12 to spacer 14. Additionally, in such embodiments, contact nut 32 and contact nut 34 may serve a useful role in preventing the connector 16 from becoming disconnected from spacer 12 and spacer 14. It is noted, however, that hex nut 30 may be positioned within an acceptable range such that contact nuts 32, 34 may not be necessary. Of course, connector 16 may comprise other types of length adjustment means in lieu of or in addition to screws and nuts, such as telescoping members, clamps, ratchets, and turnbuckles, for example. Regardless of the manner of adjustment, changing the distance between the spacers 12, 14 also adjusts the distance between the outer walls 20, 24, 36, 38 of the force sensor 10, and therefore serves in general to change the size and shape of force sensor 10.

Still referring to FIG. 1, in force sensor 10, a first triangular top face 17 and a second triangular top face 15 are shown for spacer 12 and spacer 14, respectively. In this embodiment, such a triangular shape is useful for engagement in the corners at the right angle intersections of walls 18, 22 and walls 36, 38, which are shown in an overall rectangular arrangement. In other embodiments, differently shaped spacers may be used, depending on the shape and arrangement of the desired walls with which such spacers are engaged. In still other embodiments, spacers may not be used, and one or more inner walls, which may have any desired shape, may connect directly to connector 16 by any suitable means, which may or may not be adjustable. As described below, force sensor 10 may be used to measure forces that are generated in a shipping article.

Figure 2:
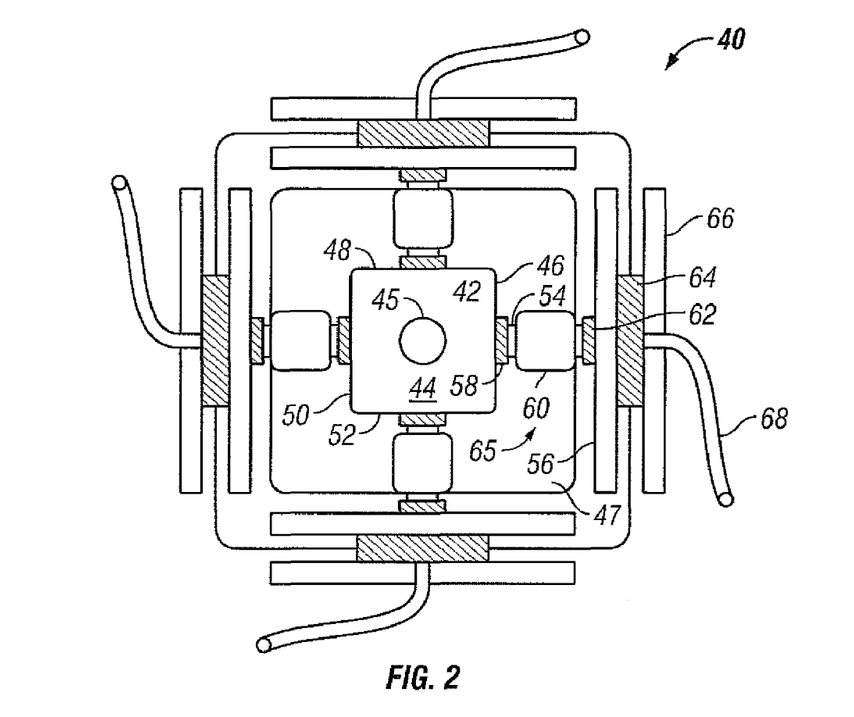
FIG. 2 is a top plan view of another embodiment of a force sensor.

FIG. 2 shows a top plan view of another force sensor 40. Force sensor 40 includes a central body 42, which may be but is not limited to a cube and may have six faces, including a top face 44 as shown and a bottom face (not shown) opposite top face 44. In FIG. 2, the edges of vertically oriented faces of central body 42 are shown and are labeled as first vertical face 46, second vertical face 48, third vertical face 50, and fourth vertical face 52. In force sensor 40, the bottom face of central body 42 is connected to a bottom plate 47 that may be used to provide a base region upon which force sensor 40 rests. A load cell may be connected, as described in more detail herein, using among other elements an inner wall, screw, and nut, to one or more faces of central body 42. The connection of load cells to one or more faces of central body 42 is similar for each face, and therefore the components connecting a load cell to a face of central body 42 are labeled only for first vertical face 46. Connections to the top face 44 are not shown for clarity so as to avoid blocking other features of force sensor 40. A screw hole 45 is shown on top face 44 and may be used for connecting elements to that top face 44. From first vertical face 46 of central body 42, a connector 65 comprising a first screw 54 is attached through a screw hole in face 46. First screw 54 extends to and connects with a first inner wall 56. Attached to first screw 54 is a first body contact nut 58, a hex nut 60, and a first inner wall contact nut 62. The hex nut 60 and screw 54 allow for an adjustment of the relative position of first vertical inner wall 56 in relation to central body 42. First body contact nut 58 and first inner wall contact nut 62 may play a role in preventing an operator from adjusting screw 54 beyond a range where first vertical inner wall 56 and central body 42 are attached. That function may be convenient but is not necessary for the operation of force sensor 40. Although this embodiment of connector 65 is adjustable, connector 65 may or may not be adjustable. Attached to the first inner wall 56 is a first load cell 64. The first load cell 64 is sandwiched between first inner wall 56 and a first outer wall 66. In other embodiments, any number of load cells may be connected to an inner wall, and those load cells may or may not share a common outer wall. In force sensor 40, a conduit 68 is connected to first load cell 64, and conduit 40 may include one or more wires or fluid connections such as may be necessary to use first load cell 64, including without limitation to input or output data, including without limitation force related data from first load cell 64.

Referring again to FIG. 1, connector 16 is included along a diagonal axis that runs substantially between two corners of the force sensor 10, and each end of the connector 16 is attached to two walls of force sensor 10 via a spacer 12, 14. In that embodiment, a longitudinal axis of connector 16 is disposed at an acute angle with respect to walls 18, 20, 22, 24, 36, and 38, and adjustment of connector 16 results in movement of a plurality of walls. By contrast, in the embodiment of FIG. 2, several connectors 65 are shown, each of which generally lies along an axis that is normal to a wall of force sensor 40, and each connector 65 is connected to only one wall of force sensor 40. In that embodiment, adjustment of connector 65 results in movement of only one inner wall of force sensor 40 independently of the other inner walls. Of course, connectors may be oriented in any desired relationship with respect to various walls of a force sensor as described herein, depending on the particular application. The walls of a force sensor may be oriented in any desired relationship, including but not limited to a relationship that is substantially polygonal as shown. In some embodiments, a connector may comprise an actuator, which may allow for the adjustment of one or more walls of a force sensor. An actuator may operate by any suitable means, including without limitation hydraulic, pneumatic, mechanical, or electromechanical means, or a combination of any of the foregoing. In some embodiments, one or more walls may not be operatively connected to an adjustable means. Those one or more walls may or may not be connected to one or more load cells.

In some embodiments, more than one load cell may be attached to the same inner wall. When more than one load cell is attached to the same inner wall, those load cells sharing a common inner wall may or may not share the same outer wall. The presence of several load cells connected to the same outer wall may allow a user to average measurements provided from individual load cells, which may increase the accuracy of force measurements. The presence of several load cells connected to the same outer wall may, in some embodiments, help identify measurement errors, including without limitation identification of when a load cell may be damaged. For example, a force on an outer wall may be measured in a recognizable manner by one or more working load cells connected to that outer wall, and in contrast, one or more damaged load cells may produce an obviously erroneous measurement.

In some embodiments, forces on an outer wall may be directed in such a way as to encourage different types of movement or deformation of an outer wall. For example, and without limitation, one or more forces may encourage twisting, bending, rotation, or any combination of any of the foregoing on an outer wall. Those forces may cause one or more load cells, or part of a load cell, to be under strain at any specific time, and one or more load cells, or part of a load cell, under strain may be in a state of either compression or tension. For some types of forces, some load cells, or parts of a load cell, under strain may be in compression and others may be in tension. In some embodiments, the distribution of one or more load cells, or parts of one or more load cells, that may be in states including but not limited to compression or tension, may be used to understand one or more forces on an outer wall. A load cell, or parts of a load cell, may in some embodiments be capable of measurement of a force when in either compression or tension, when in compression only, when in tension only, or when in both tension and compression.

Figure 3:
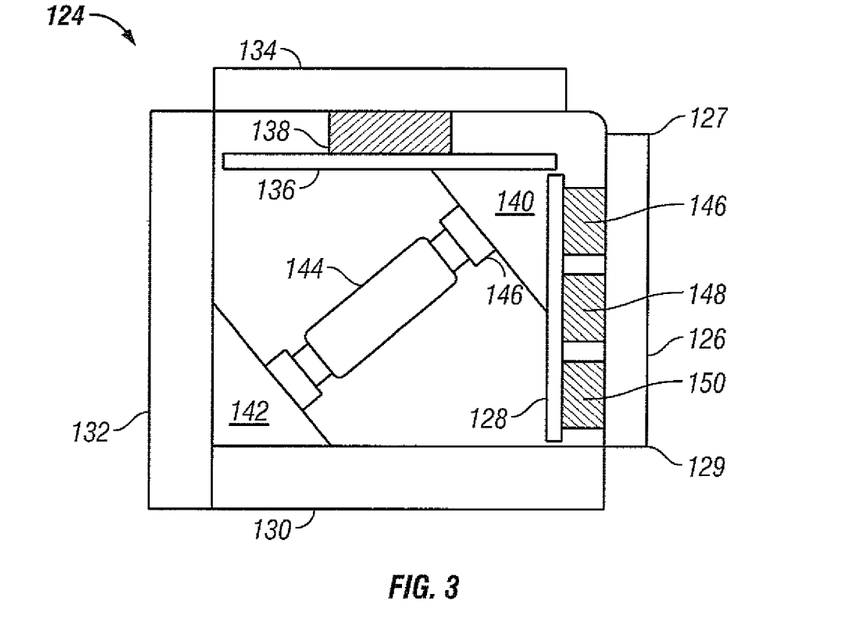
FIG. 3 is a top plan view of still another embodiment of a force sensor.
Figure 4:
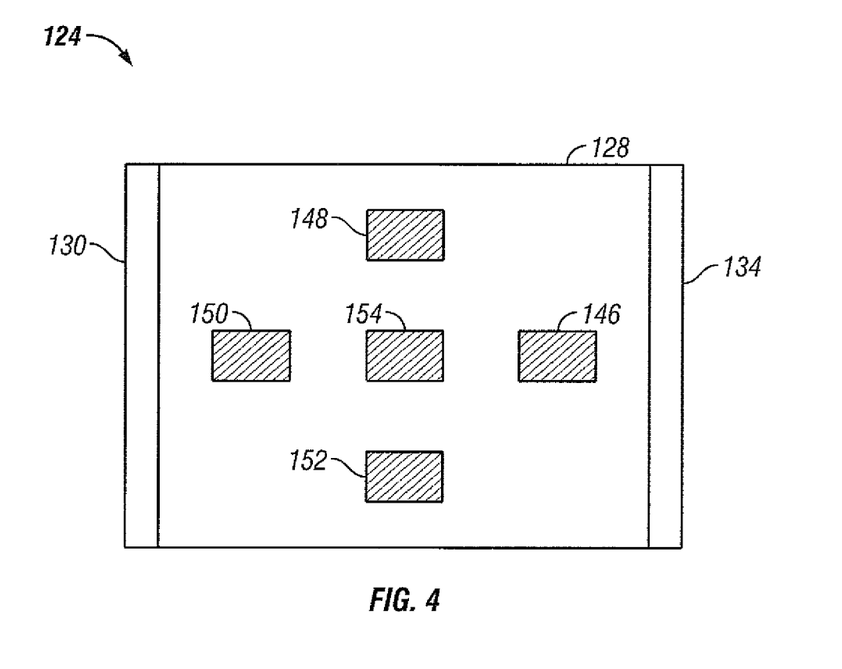
FIG. 4 is a side elevational view of the force sensor shown in FIG. 3.

FIG. 3 shows a force sensor 124 that has more than one load cell connected to a first inner wall 128. Force sensor 124 also includes a second inner wall 136. Force sensor 124 has a first outer wall 126 that may be described to have a right edge 127 and a left edge 129. Force sensor 124 also has a second outer wall 130, a third outer wall 132 and a fourth outer wall 134. Force sensor 124 includes a first load cell 138 sandwiched between the second inner wall 136 and fourth outer wall 134. A first spacer 140 and a second spacer 142 are connected to a screw 146 that has a nut 144. Adjustment of nut 144 allows one to change the relative distance between first spacer 140 and second spacer 142 and therefore change the size of force sensor 124 such that force sensor 124 has at least one dimension that is mechanically adjustable in length. The first inner wall 128 of force sensor 124 also includes a second load cell 146, a third load cell 148, and a fourth load cell 150. Two additional load cells 152, 154 (see FIG. 4) are connected to first inner wall 128; however, those additional load cells are obscured by third load cell 148 in the top view of FIG. 3. FIG. 4 shows force sensor 124 as viewed looking in the direction of a line perpendicular to first outer wall 126. In FIG. 4, first outer wall 126 is removed so that one may view the arrangement of load cells that are connected to first inner wall 128. As shown in FIG. 4 a fifth load cell 152 and a sixth load cell 154 are present.

In some embodiments, a force on one side of an outer wall of a force sensor may be transferred to one or more load cells on the other side of that outer wall. For example and in reference to FIG. 3 and FIG. 4, a force may be incident upon outer wall 126 of force sensor 124, and that force may be, for example, incident at a location close to right edge 127. That force may, for example, be compressive and may cause compressive strain on load cells including but not limited to second load cell 146. That force may also induce a strain in outer wall 126 such that outer wall 126 slightly bends about one or more load cells of force sensor 124. Those force sensors upon which outer wall 126 may slightly bend may be, for example and without limitation, third load cell 148, fifth load cell 152 and sixth load cell 154. As outer wall 126 slightly bends, a load cell including but not limited to load cell 150 may become strained in tension. The distribution of one or more load cells, or parts of load cells, that may be in tension, or that may be in compression, and the manner in which an outer wall may bend when one or more forces are applied may be dependent upon the location of load cells in relation to those one or more forces. If at least two load cells are placed on an outer wall of a force sensor, those load cells may be capable of measuring both the magnitude and orientation of forces incident on an outer wall, including without limitation a torsional force that may tend to rotate an outer wall. If at least three load cells are placed on an outer wall of a force sensor and those three load cells substantially define a plane, those load cells may be capable of measuring forces incident on an outer wall, including without limitation a torsional force that tends to rotate an outer wall in any direction.

Figure 5:
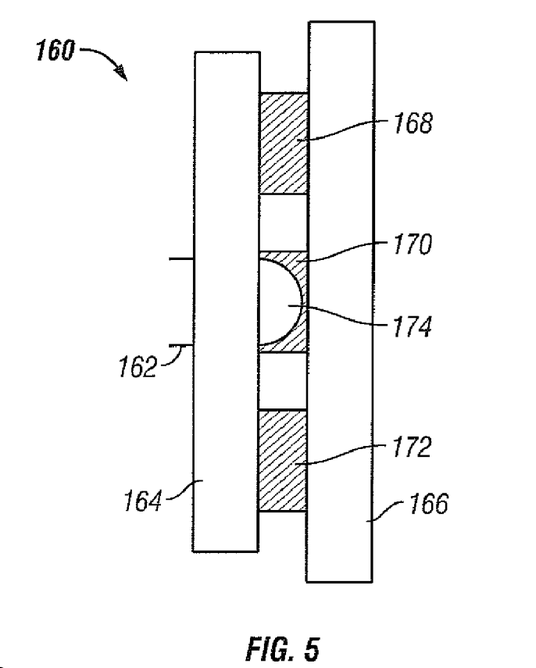
FIG. 5 is a top plan view of a part of a force sensor.
Figure 6:
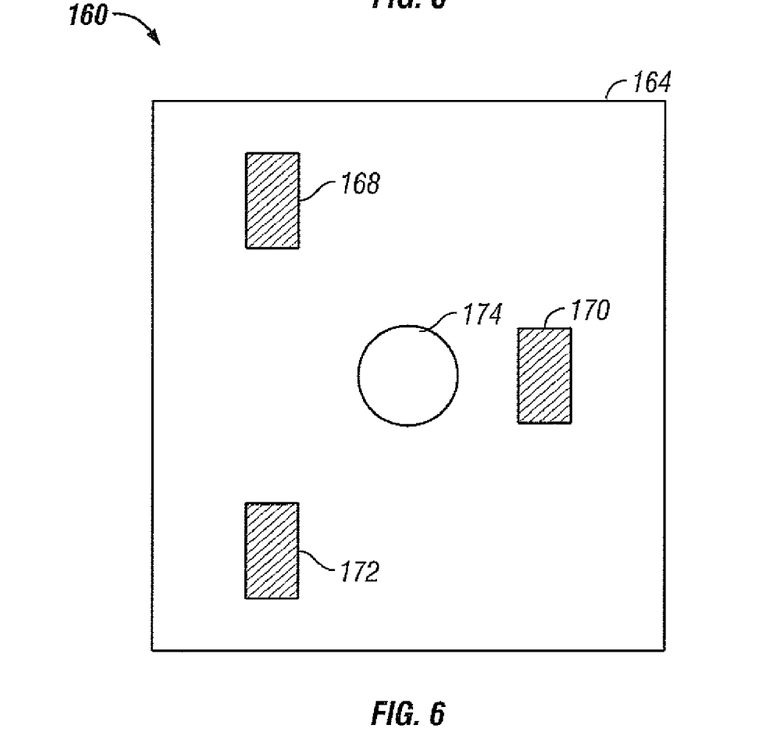
FIG. 6 is side elevational view of the part of a force sensor shown in FIG. 5.

A force sensor may include an outer wall that may slightly bend about one or more load cells. An example of this, without limitation, is described above in reference to load cell 124. In other embodiments, a force sensor may slightly pivot about a structure that is not a load cell. A top view of a part of a force sensor 160 is shown in FIG. 5. That part of a force sensor 160 includes a nut 162 that is attached to an inner wall 164. Inner wall 164 has a first load cell 168, a second load cell 170, and a third load cell 172 attached to that inner wall and sandwiched between inner wall 164 and an outer wall 166. Inner wall 164 and outer wall 166 may be physically connected to each other by a pivoting region 174. The pivoting region 174 may include a ball and socket joint wherein outer wall 166 is free to rotate about any axis. A pivoting structure may be a hinge and may allow the outer wall to pivot with respect to a single rotational axis. FIG. 6 shows an alternate view of a part of a force sensor 160 as viewed along a perpendicular, normal axis to the face of inner wall 164. Outer wall 166 is removed from the view of FIG. 6 so that the position of first load cell 168, second load cell 170, third load cell 172 and pivot element 174 connected to inner wall 164 may be seen.

Figure 7:
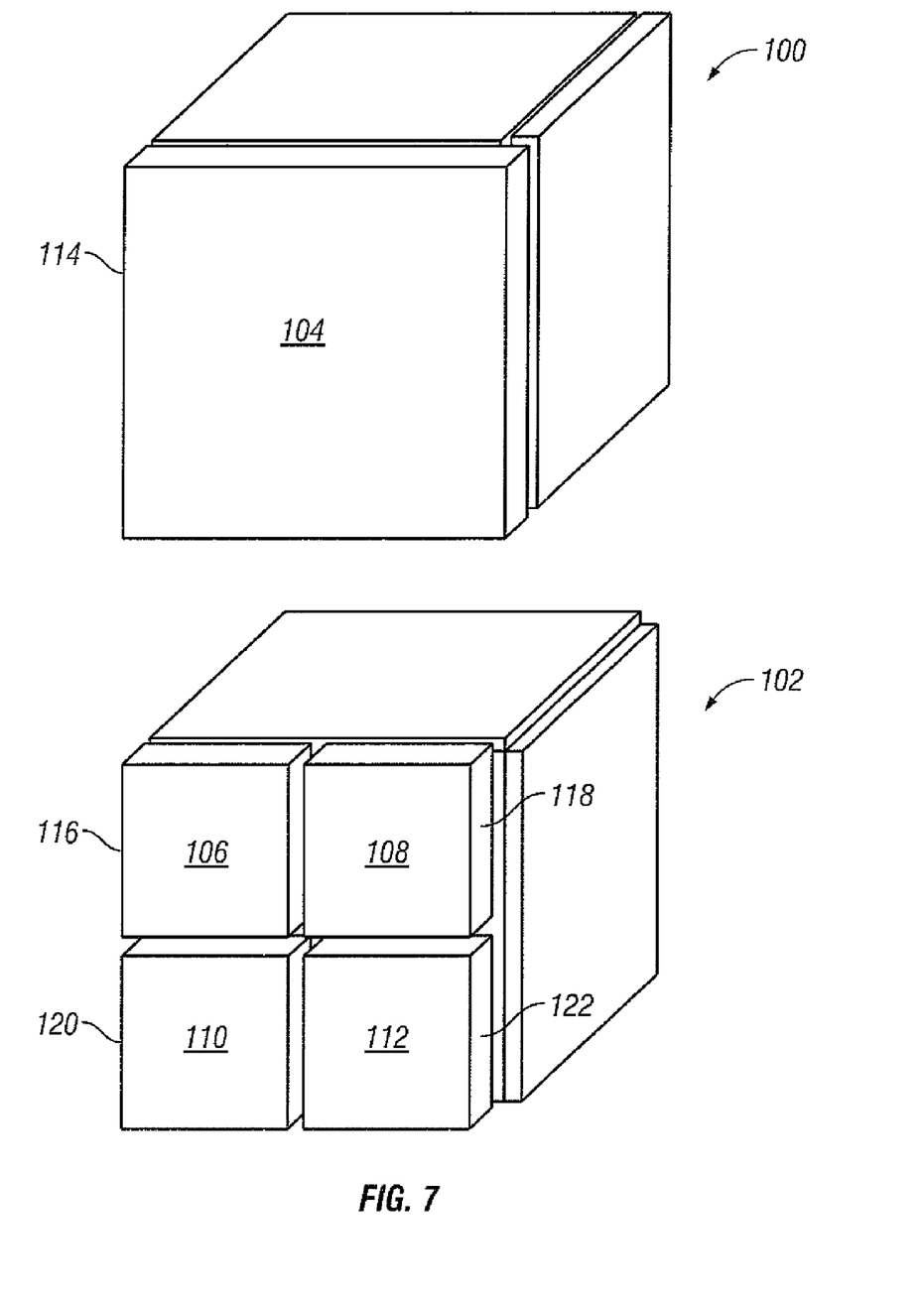
FIG. 7 is a perspective view from the front of two embodiments of force sensors.

In some embodiments, the outer surface of an outer wall of a force sensor may have an outer wall area and may serve as a region upon which a force from the external environment may be incident on a force sensor. The outer wall area and a measurement of force incident on that outer wall may be used in a calculation of pressure. In some embodiments, a force sensor may have more than one outer wall substantially on the same plane. FIG. 7 shows a perspective view of a first force sensor 100 and a perspective view of a second force sensor 102. First force sensor 100 has an outer wall 114 with an outer wall surface 104. Outer wall surface 104 is of a rectangular shape and has an associated area. In other embodiments, other shapes of an outer wall surface may be used. The outer wall 114 may be connected to one or more load cells that may measure a force incident on the outer wall surface 104. Second force sensor 102 has on a front side thereof a first small outer wall 116, a second small outer wall 118, a third small outer wall 120, and a fourth small outer wall 122. Those small outer walls are oriented substantially in the same plane. Those walls have associated small outer wall surfaces, including first small outer wall surface 106, second small outer wall surface 108, third small outer wall surface 110, and fourth small outer wall surface 112. Each of those small outer walls may be connected to one or more load cells that may measure a force incident on the corresponding small outer wall surface. In some embodiments, the spatial resolution in which a force sensor may measure a different force or pressure may be dependent upon the area of outer surfaces of outer walls. In this light, second force sensor 102 may be considered to be more capable of measuring a force or pressure that varies over distance than first force sensor 100.

In some embodiments, the outer wall of a force sensor may include a surface that is not planar; for example, such an outer surface may have but is not limited to the shape of a curve. By way of example, and without intent to be limited, an outer wall of a force sensor may include a surface that is curved and that may resemble in its shape a portion of the outer surface of an object, such as a beverage can or bottle. A surface may in some embodiments be connected to a load cell using an intermediate spacer element. In some embodiments, that intermediate spacer element may have one wall that substantially matches a surface of an outer wall and another surface that connects to a load cell. The surface that connects to a load cell, may be, for example, and without intent to be limited, a planar surface, a curved surface, or any other surface that facilitates connection to a load cell. An intermediate spacer may be comprised of one or more separate pieces connected to an outer wall. Alternatively, an intermediate spacer element and an outer wall may be constructed as a single piece. In some embodiments, an outer surface of a force sensor may substantially match or may be substantially complementary to all or a portion of a predetermined object or a predetermined packaging material. For example and without limitation, a force sensor may have an outer shape which substantially matches that of a beverage can such that the force sensor may be substituted for a beverage can in a shipping article, or a force sensor may have an outer shape which is substantially complementary to the shape of at least a portion of a beverage can such that the force sensor may mate with a beverage can in a shipping article.

In some embodiments, a load cell may include or be connected to a memory or other suitable means for storing data associated with one or more forces that may be incident on that load cell. Such memory or other means for storing data may include but is not limited to a computer memory or storage. In some embodiments, additional diagnostic instruments may be added to a force sensor as described herein, including without limitation diagnostic instruments such as thermometers, thermocouples, humidity sensors, light sensors, acoustic sensors, and/or other sensors that may record temperature, humidity, light, sound, or other conditions of interest in the vicinity of a force sensor. Such conditions may be correlated with the forces measured by the force sensor and used to optimize a packaging process.

One or more force sensors as described herein may be used in a method for improving a packaging process, and those force sensors may measure various forces that may be present on one or more objects, packaging material, or a combination of both. Those force sensors may be designed such that they substantially match the shape of an object or packaging material or are substantially complementary to the shape of an object or packaging material. In some methods for improving a packaging process, force sensors shaped substantially to match both an object and packaging material may be included. Force sensors may measure without limitation the magnitude of an applied force and/or the direction of an applied force. Force sensors may be capable of measuring rotational forces (or torque) applied to an object or to packaging material. In some embodiments, those force sensors may be capable of measuring one or more forces as a function of time and storing data associated with those forces as a function of time for future analysis.

Figure 8:
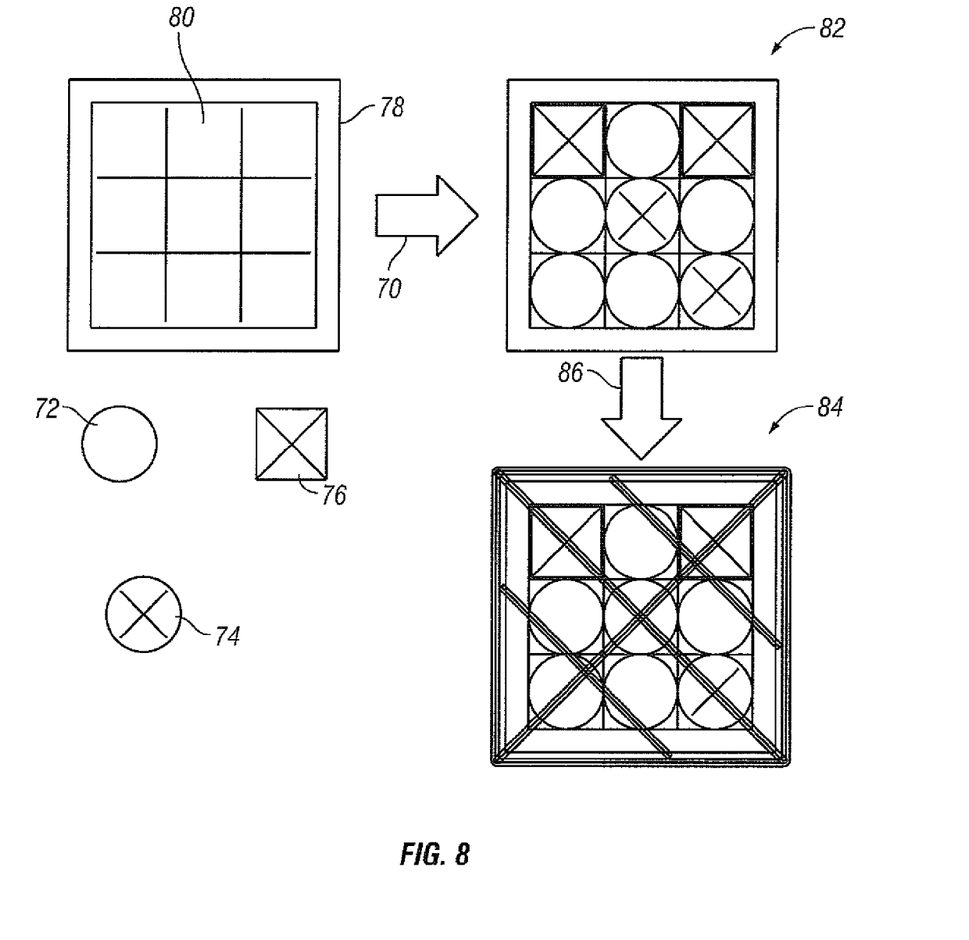
FIG. 8 is a schematic view of objects, force sensors, and packaging material combined to create a shipping article.

FIG. 8 shows by way of example, and without intent to be limited, a possible manner in which force sensors may be loaded in packaging material 78. In loading step 70, one or more objects 72, one or more force sensors 74 substantially shaped like object 72, and one or more force sensors 76 substantially shaped like a compartment 80 of packaging material 78 are loaded into that packaging material 78, thereby forming a first shipping article 82. As explained in more detail herein, after that loading step 70, any number of additional packaging process steps may be performed. For example, as shown in FIG. 8, a next step 86 may involve the application of shrink wrap to create a wrapped shipping article 84. The use of one or more force sensors in a shrink wrapping process is described in some embodiments; however, such discussion should not be intended to limit the use of those force sensors to a shrink wrap process. Rather, such discussion should be viewed in an exemplary manner, and the use of force sensors may apply to any step or steps involved in a packaging process.

Figure 9:
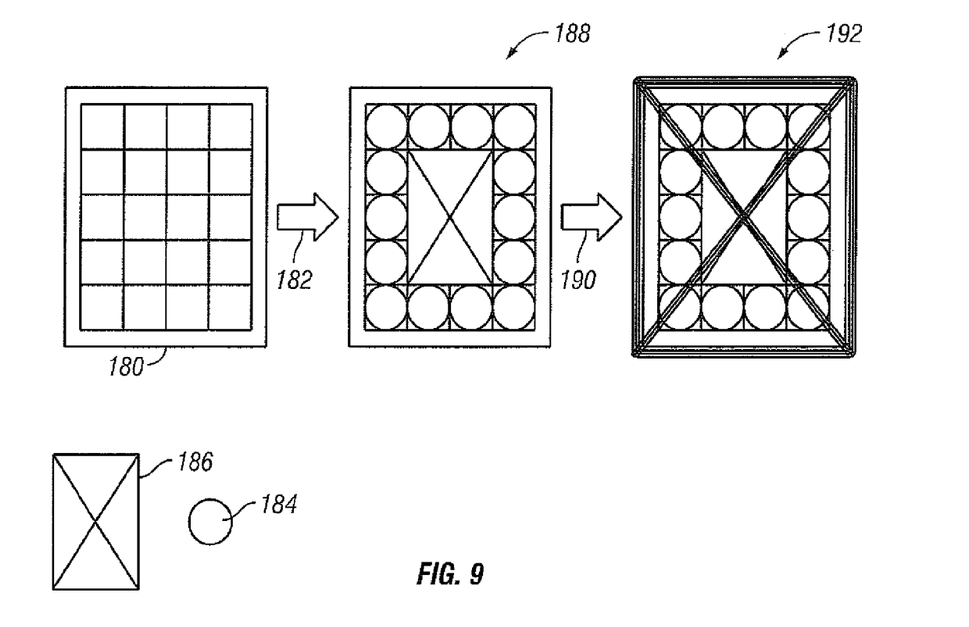
FIG. 9 is another schematic view of objects, force sensors, and packaging material combined to create a shipping article.

FIG. 9 shows, by way of example, another possible manner in which a force sensor may be loaded in packaging material 180. In loading step 182, one or more objects 184 and a force sensor 186 are loaded in packaging material 180 to create a shipping article 188. That shipping article 188 may be subject to various additional process steps, including a shrink wrap process 190 that involves the application of shrink wrap to create a wrapped shipping article 192.

FIG. 8 and FIG. 9 illustrate non-limiting examples of objects, force sensors, and packaging material and how those elements may be combined. An object may, for example, be a beverage can, which may be packaged in packaging material, which may for example be a paperboard carton, such as a carton with individual compartments for each object. Any number of other objects and packaging material may be involved in a packaging process. By way of example, objects may include but are not limited to beverage cans, food items, boats, or manufactured homes.

An object or packaging material that undergoes a packaging process may be subjected to various forces. For example, in shrink wrapping, a film changes shape, and as that film shrinks it may pull on objects or packaging material or apply any number of other forces to a packaged object. A force may have an applied magnitude and direction in relation to an object or packaging material, and that magnitude and direction may be affected by any number of variables. In a shrink wrap process, for example, those variables may include among a number of others the degree to which the film is stretched in one or more directions, the temperature of the film during application, and the orientation of an object or package material with respect to that film. It is noted that some shrink wrap processes are designed such that the film shrinks primarily in one direction, in a bi-directional manner, or in a combination of directions depending upon the composition of the film and the degree to which it may be stretched in various directions. Depending upon the shape of the package material and objects that may be present in a shrink wrapping process step, various points of contact may be found between the shrink wrap film and the object or package material. The orientation of those points of contact may impact the associated forces on that object or package material, including without limitation the magnitude and direction of a rotational force (or torque). Those forces, together with properties including moments of inertia of objects or package material, may affect the probability that those elements are moved, twisted, or damaged by some other means during the packaging process. In some embodiments, a force sensor may be designed to have substantially the same shape, substantially the same moment of inertia, or both, as all or a part of an object or packaging material. A force sensor may in some embodiments be used to evaluate the effects of bottle design on stability of a case unit, at any step in a packaging process. As a shipping article is transported, vibrations or other forces may cause, among other things, a change in the elasticity of shrink wrap, and that change, or other changes, may alter the magnitude or direction of a force the shrink wrap may apply to an object or to packaging material. The use of one or more force sensors may characterize the effects of those forces or vibrations, including but not limited to how they interact with one or more forces that may be applied by shrink wrap. In some embodiments, a film may be applied over multiple cases that may be loaded into pallets. The use of one or more force sensors may be used to characterize forces on objects or packaging materials at different positions within a pallet. Those forces may be measured as those pallets are stored, during transport, or at any other step in a packaging process.

Figure 10:
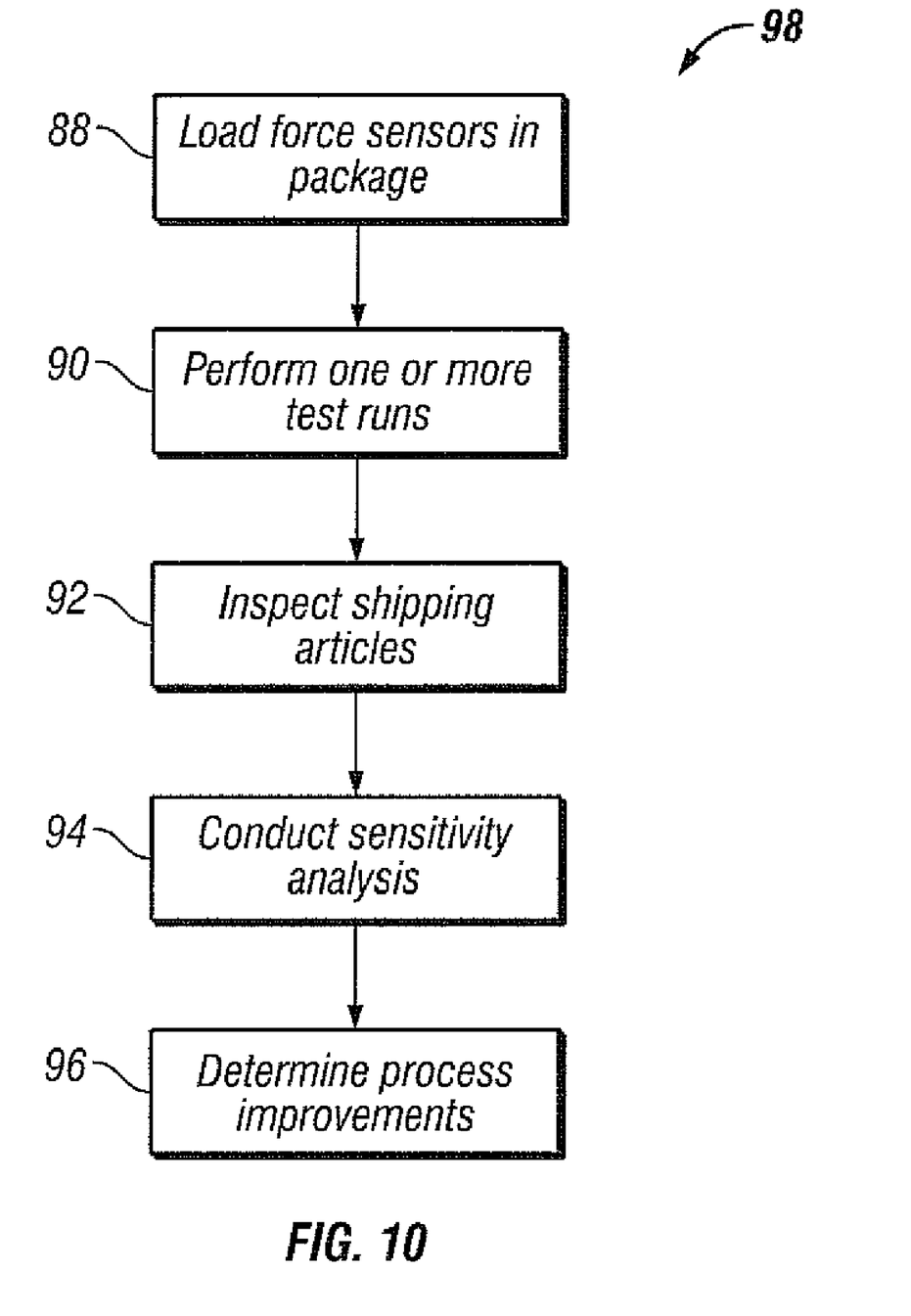
FIG. 10 is a flowchart illustrating a method of improving a packaging process.

A method 98 of improving a packaging process is shown in FIG. 10. In a first step of method 98, a loading step 88 involves placing one or more force sensors in packaging material. In some embodiments, this may include handling force sensors of substantially the same shape, size, and/or weight of an object in an automated loading procedure. Forces may be measured in this step, and any distribution of objects and sensors, including for example sensors of different types, may be loaded in packaging material. In some embodiments, those different sensor types may include without limitation force sensors with a range of shapes, weights, sizes, or a combination thereof in packaging material. Such an experiment may for example be useful to understand whether objects with slightly different aspect ratios experience the same or different forces, or are more or less likely to be dislodged, in a packaging process.

In a next step 90 of FIG. 10, one or more test runs may be made, wherein one or more steps of a packaging process are performed. Test run step 90 may include performing the same steps of a packaging process on one or more different shipping articles, such as may be used to generate statistical data for a packaging process. Alternatively, different packaging process steps may be performed, and any number of variables may be studied for that packaging process. For example, and without limitation, variables in a packaging process may include the temperature of a shrink wrap process step, the degree of film stretch in a shrink wrap process step, the number of shipping articles stacked, the vibration of shipping articles, and/or other variables. Force data may be collected for those test runs. Force data for a packaging process may be organized in a number of ways, and may be described by statistics including but not limited to a mean, median, average, maximum value, minimum value or standard deviation for one or more forces.

In a next step 92 of FIG. 10, inspection of shipping articles may be performed. Inspection step 92 may include but is not limited to a statistical analysis of damage to objects, force sensors, packaging material, or any combination thereof. That damage may include but is not limited to bending, deformation, twisting, dislodging, or any combination thereof. As shown in FIG. 10, an inspection step 92 is shown after test runs are performed. It should be understood that inspection may be performed after test runs are performed that involve one or more steps in a packaging process. In some embodiments, one may inspect a shipping article after one step in a packaging process, perform a second step in a packaging process and execute a second inspection step. In this regard, any combination of process steps, during which a force measurement may be made, and inspection steps may be considered in various embodiments of methods for improving a packaging process.

In a next step 94 of FIG. 10, an analysis of sensitivity of a packaging process may be conducted. Sensitivity analysis step 94 may involve a comparison of damage statistics determined in an inspection step 92 with force data. Such force data may involve different force magnitudes, force directions, and/or a combination of both magnitude and direction. For example, and without intent to be limited, one may determine in a sensitivity analysis step 94 the probability of bending of package materials, or any other form of damage, with a change in force along any particular axis. One may determine in a sensitivity analysis step 94 the probability of damage of any type for a particular force along an axis or for a combination of one or more forces along one or more axes. Analysis may involve consideration of one or more forces in the same step of a packaging process or may be used to examine the relationship of one or more forces in different steps of a packaging process. Analysis may in some embodiments involve the determination of a threshold value of one or more forces that has a threshold probability for damage of any type.

In a next step 96 of FIG. 10, process improvements may be determined. For example, and without limitation, one may determine from one or more process variables those process variables that apply forces lower than a threshold value for damage. In some embodiments, a packaging process may be improved by selecting packaging process variables that have been measured to apply, or have been calculated to apply, one or more forces to an object or packaging materials. In some embodiments, calculation of forces that one or more variables may apply in a packaging process may be accomplished by means including but not limited to extrapolation or interpolation from collected force data in various test runs.

In some embodiments, packaging process variables may be selected that apply one or more forces. Those one or more forces may be based on calculations including without limitation calculation of a maximum sum of the difference between those one or more forces, and one or more forces that have been determined to cause damage to a shipping article. In some embodiments, one may select process variables that apply forces based on any of a range of different force statistics, including but not limited to the mean, median, average, maximum value, minimum value, or standard deviation. By way of example, and without limitation, one may select a process that preferentially minimizes those forces that may show the highest variation, or largest standard deviation in a particular packaging process, or one may select a process that preferentially minimizes those forces that have the highest probability of damage.

In some embodiments, one may determine process variables for a packaging process, wherein those process variables are selected to minimize the probability of damage to a shipping article. Those determined process variables may serve as a baseline packaging process. Using one or more force sensors in that baseline packaging process, one may characterize forces on an object, packaging material, or both. In this manner, one may associate a baseline packaging process with process variables and one or more baseline forces. In some embodiments, one may use one or more force sensors in one or more steps of a packaging process in a method of monitoring that packaging process. In some embodiments, that monitoring may involve periodic use of one or more force sensors in one or more steps of a packaging process. The use of force sensors in one or more steps of a packaging process may also be used when an engineer suspects that a change in a packaging process may have occurred, including but not limited to following a power outage, or during maintenance or repair of a tool used in a packaging process. In some embodiments, a change in one or more forces in a packaging process may serve to indicate that the process has changed even though damage to objects or packaging material is not present. In this manner, corrective actions may be taken before shipping articles are damaged.

Although the foregoing specific details describe certain embodiments of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A force sensor, comprising:
    an inner wall;
    an outer wall spaced apart from said inner wall, said outer wall comprising an outer surface on which an external force may be applied;
    a load cell disposed between said inner wall and said outer wall, said load cell being adapted for producing a signal in response to said force; and
    a third wall and a connector, said connector being connected to said inner wall and said third wall, wherein said connector is adjustable;
    wherein said connector is disposed at an acute angle with respect to each of said walls.

2. The force sensor of claim 1, wherein said outer wall further comprises an inner surface in contact with said load cell; and
    wherein an end of said connector is connected to two walls.

3. The force sensor of claim 2, further comprising:
    a first spacer interposed between the connector and the inner wall; and
    a second spacer interposed between the connector and two other walls;
    wherein another end of said connector is connected to said two other walls.

4. The force sensor of claim 3, wherein said two walls form a first corner and said two other walls form a second corner opposite said first corner.

5. The force sensor of claim 1, wherein said outer surface of said outer wall is non-planar.

6. The force sensor of claim 1, wherein said outer surface of said outer wall comprises a shape that is substantially complementary to a portion of a predetermined object.

7. The force sensor of claim 1, wherein said outer surface of said outer wall comprises a shape that is substantially complementary to a portion of predetermined packaging material.

8. The force sensor of claim 1, wherein said outer wall comprises a plurality of sections, and wherein said load cell comprises a plurality of load cells, each of said plurality of load cells being engaged with a respective one of said plurality of sections.

9. A force sensor comprising:
    an inner wall;
    an outer wall spaced apart from said inner wall, said outer wall comprising an outer surface on which an external force may be applied;
    a load cell disposed between said inner wall and said outer wall, said load cell being adapted for producing a signal in response to said force; and
    a central body and an adjustable connector, said connector being connected to said inner wall and said central body;
    wherein said adjustable connector is configured to change a length between said outer wall and said central body upon adjustment of said adjustable connector.

10. The force sensor of claim 9, further comprising a third wall and a second connector, said second connector being connected to said central body and said third wall.

11. The force sensor of claim 9, wherein said inner wall comprises a plurality of inner walls arranged in a substantially polygonal configuration, and wherein said connector comprises a plurality of connectors respectively connected to said plurality of inner walls and said central body.

12. The force sensor of claim 11, wherein said load cell comprises a plurality of load cells, and wherein said outer wall comprises a plurality of outer walls, wherein each of said plurality of load cells is sandwiched between a respective one of said plurality of inner walls and a respective one of said plurality of outer walls.

13. The force sensor of claim 9, wherein said outer surface of said outer wall is non-planar.

14. The force sensor of claim 9, wherein said outer surface of said outer wall comprises a shape that is substantially complementary to a portion of a predetermined object.

15. The force sensor of claim 9, wherein said outer surface of said outer wall comprises a shape that is substantially complementary to a portion of predetermined packaging material.

16. A force sensor, comprising:
    an inner wall;
    an outer wall comprising an outer surface on which a torsional external force may be applied; and
    at least two load cells sandwiched between said inner wall and said outer wall;
    wherein said force sensor has at least one dimension that is mechanically adjustable in length;
    wherein said load cells are arranged in a manner to permit measurement of said torsional external force.

17. The force sensor of claim 16
    wherein said outer wall further comprises an inner surface parallel to said outer surface; and
    wherein said at least two load cells are in contact with said inner surface.

18. The force sensor of claim 16, wherein said outer surface of said outer wall is non-planar.

19. The force sensor of claim 16, wherein said outer surface of said outer wall comprises a shape that is substantially the same as at least a portion of a predetermined object.

20. The force sensor of claim 16, wherein said outer surface of said outer wall comprises a shape that is substantially the same as at least a portion of a predetermined packaging material.

* * * * *